(12) United States Patent
    Kanayama

(10) Patent No.: US 7,586,296 B2
(45) Date of Patent: Sep. 8, 2009

(54) POWER SUPPLY APPARATUS

(75) Inventor: Mitsuhiro Kanayama, Takahama (JP)

(73) Assignee: Denso Corporation, Kariya (JP)

( * ) Notice: Subject to any disclaimer, the term of this patent is extended or adjusted under 35 U.S.C. 154(b) by 163 days.

(21) Appl. No.: 11/714,171

(22) Filed: Mar. 6, 2007

(65) Prior Publication Data

US 2007/0217238 A1    Sep. 20, 2007

(30) Foreign Application Priority Data

Mar. 17, 2006    (JP)    ............... 2006-074987

(51) Int. Cl.
    *G05F 1/40*    (2006.01)
(52) U.S. Cl. ........................................ 323/282
(58) Field of Classification Search ............... 323/222, 323/224, 266, 282; 363/59, 62
    See application file for complete search history.

(56) References Cited

U.S. PATENT DOCUMENTS 4,964,029 A * 10/1990 Severinsky et al. ............ 363/80
6,181,084 B1 * 1/2001 Lau ............................. 315/291

2005/0077882 A1    4/2005  Nishino

FOREIGN PATENT DOCUMENTS

| JP | 03-040886 | 4/1991 |
|---|---|---|
| JP | 2000-166223 | 6/2000 |
| JP | 2005-117784 | 4/2005 |
| JP | 2005-117828 | 4/2005 |
| JP | 2005-312141 | 11/2005 |

* cited by examiner

*Primary Examiner*—Adolf Berhane
(74) *Attorney, Agent, or Firm*—Nixon & Vanderhye P.C.

(57) ABSTRACT

The power supply apparatus includes a stepdown switching power supply circuit having a switching element and a smoothing circuit, a filter circuit located in the upstream of the stepdown switching power supply circuit and having a noise-suppressing inductor, and a stepup switching power supply circuit having a switching element and a flyback voltage generating inductor. In this power supply apparatus, one and same inductor is used as the noise suppressing inductor and the flyback voltage generating inductor.

9 Claims, 8 Drawing Sheets

POWER SUPPLY APPARATUS

CROSS-REFERENCE TO RELATED APPLICATION

This application is related to Japanese Patent Application No. 2006-74987 filed on Mar. 17, 2006, the contents of which are hereby incorporated by reference.

BACKGROUND OF THE INVENTION

1. Field of the Invention

The present invention relates to a power supply apparatus which operates to regulate an output voltage of an external power source such as a battery at a predetermined voltage value, and supplies it to various power supply objects (electric loads).

2. Description of Related Art

It is common that a vehicle-mounted electronic control unit generates, from a battery voltage (a voltage at a positive terminal of a vehicle battery), a power supply voltage lower than the battery voltage, and supplies it to a microcomputer and its peripheral circuits included therein.

As a power supply apparatus capable of generating such a power supply voltage, a series power supply circuit (a series regulator), or a stepdown switching power supply circuit (a stepdown type switching regulator) can be used. The series power supply circuit can output a voltage with a small ripple, however, the efficiency thereof is low and accordingly power loss thereof is large. On the other hand, the stepdown switching power supply circuit has a high efficiency (small power loss), however, a ripple in its output voltage is large.

Accordingly, there has been proposed a power supply apparatus constituted by a series power supply circuit and a stepdown switching power supply circuit located in the upstream (in the prestage) of the series power supply circuit, in order to reduce the power loss of the series power supply circuit, and reduce the ripple in the output voltage (refer to Japanese Patent Application Laid-open No. 2005-312141, for example).

In the power supply apparatus having such a configuration, since the stepdown switching power supply circuit causes switching noise, a filter circuit having an inductance needs to be provided in the upstream of the stepdown switching power supply circuit, so that the switching noise caused by the stepdown switching power supply circuit is not emitted to the outside of an electronic control unit in which the power supply apparatus is mounted. This makes it possible to prevent electric equipment located near the electronic control unit such as a radio receiver from being affected by the switching noise.

The power supply apparatus having the configuration described above may be provided with a stepup switching power supply circuit (a stepup type switching regulator), so that the electronic control unit can continue its operation even when the battery voltage falls below the power supply voltage to be supplied to various components within the electronic control unit.

FIG. 8 is a circuit diagram showing a structure of an example of such a power supply apparatus. As shown in this figure, this power supply apparatus includes a series power supply circuit 31, a stepdown switching power supply circuit 21, a filter circuit 11, and a stepup switching power supply circuit 41.

The series power supply circuit 31 is constituted by a transistor (PNP transistor in this example) 32, a capacitor 33, and a control circuit 34 operating to control the transistor 32.

Two output terminals (emitter and collector) of the transistor 32 are connected in series between a power supply line L3 transmitting an output voltage V3 of the stepdown switching power supply circuit 21 and a power supply line L4 through which a power supply voltage V4 is supplied to various power supply objects including a microcomputer included in the electronic control unit. The capacitor 33 is connected between the power supply line L4 and a ground line (a line at a ground potential to which a negative terminal of a vehicle battery is connected) to suppress ripple and noise in the power supply voltage V4. The control circuit 34 controls a base current of the transistor 32 such that the power supply voltage V4 is regulated at a target voltage (5V, for example).

The series power supply circuit 31 having the above described structure operates to reduce the output voltage of the stepdown switching power supply circuit 21 to generate the power supply voltage V4, and supply it to the power supply objects.

The stepdown switching power supply circuit 21 includes a transistor (P-channel MOSFET in this example) 22, an inductor 23, a diode 24, a capacitor 25, and a control circuit 26 operating to control the transistor 22.

One input terminal (drain) of the transistor 22 is connected to a power supply line L2 transmitting an output voltage V2 of the filter circuit 11 or of the stepup switching power supply circuit 41. The other output terminal (source) of the transistor 22 is connected to the cathode of the diode 24 and to one end of the inductor 23. The anode of the diode 24 is connected to the ground line. The other end of the inductor 23 is connected to the power supply line L3. The capacitor 25 is connected between the power supply line L3 and the ground line.

When the transistor 22 is on/off driven, the voltage outputted from the source of the transistor 22 to the one end of the inductor 23 changes alternately between the voltage V2 of the power supply line L2 and 0V. This output voltage of the transistor 22 is smoothed by a smoothing circuit constituted by the inductor 23, the diode 24, and the capacitor 25, and then applied to the power supply line L3. The control circuit 26 on/off controls the transistor 22 such that the voltage of the power supply line L3 is kept at a constant target voltage higher than the power supply voltage V4. Incidentally, when the transistor 22 changes from the on state to the off state, the diode 24 allows a surge current to flow through the inductor 23.

The filer circuit 11, which is constituted by an inductor 12, and capacitors 13, 14, is series-connected between a power supply line L1 to which a battery voltage V1 as an external power supply voltage is applied, and the power supply line L2. The capacitor 13 is connected between the power supply line L1 (or the upstream end of the inductor 12) and the ground line. The capacitor 14 is connected between the power supply line L2 (or the downstream end of the inductor 12) and the ground line.

The stepup switching power supply circuit 41 is constituted by an inductor 42, a transistor (N-channel MOSFET in this example) 43, a diode 44, a control circuit 45 operating to control the transistor 43, and the capacitor 14.

One end of the inductor 42 is connected to the power supply line L1. Two output terminals (drain and source) of the transistor 43 is connected in series between the other end of the inductor 42 and the ground line. The anode of the diode 44 is connected to a node between the inductor 42 and the transistor 43 (the drain of the transistor 43). The cathode of the diode 44 is connected to the power supply line L2 and to the capacitor 14 (to be more exact, to the terminal of the capacitor 14, which is located on the side opposite to the ground line). The capacitor 14 is also used as a component constituting the filter circuit 14. The above described structure of the stepup switching power supply circuit 41 is disclosed, for example, in Japanese Patent Application Laid-open No. 2005-117784.

When the transistor 43 is turned on, the voltage at the node between the inductor 42 and the transistor 43 becomes about 0V, and when the transistor 43 is turned off, a flyback voltage higher than the voltage V1 of the power supply line L1 appears at this node. Accordingly, when the transistor 43 is on/off driven, the voltage at the node between the inductor 42 and the transistor 43 changes alternately between about 0V and the flyback voltage higher than the voltage V1. This changing voltage is rectified and smoothed by a smoothing circuit constituted by the diode 44, and the capacitor 14, and then applied to the power supply line L2. The diode 44 is for preventing current backflow from the capacitor 14 to the transistor 43 when the transistor 43 is turned on. The control circuit 45 keeps the transistor 43 at the off state when the voltage V1 of the power supply line L1 is higher than a certain value. On the other end, when the voltage V1 of the power supply line L1 falls below this certain value, the control circuit 45 turns on the transistor 43 at such a duty ratio that the voltage of the power supply line L2 (that is, the output voltage of the stepup switching power supply circuit 41, or the input voltage of the stepdown switching power supply circuit 21) is kept at a constant target voltage higher than the power supply voltage V4.

With such a power supply apparatus having the stepup switching power supply circuit 41, it is possible to continue supplying the power supply voltage V4 equal to 5V to the microcomputer etc., even when the battery voltage V1 falls below 5V, because the battery voltage V1 can be stepped up above 5V, and this stepped up battery voltage is supplied to the stepdown switching power supply circuit 21, and thereafter to the series power supply circuit 31. Incidentally, when the transistor 43 is kept at the off state (that is, when the stepup switching power supply circuit 41 is not in operation), the battery voltage V1 of the power supply line L1 is supplied as it is to the stepdown switching power supply circuit 21 through the filter circuit 11, so that the battery voltage V1 is stepped down to the power supply voltage V4 of 5V by the operations of the stepdown switching power supply circuit 21 and the series power supply circuit 31 to be supplied to the microcomputer etc.

There is known a stepup/stepdown type DC/DC converter in which the same inductor is shared between its stepdown switching power supply circuit and its stepup switching power supply circuit. For example, refer to Japanese Patent Application Laid-open No. 2000-166223.

The conventional power supply apparatus as shown in FIG. 8 is large in size and is high in manufacturing cost, because each of the stepdown switching power supply circuit and the stepup switching power supply circuit included therein needs an inductor. This makes it difficult to reduce the size and manufacturing cost of the electronic control unit in which such a conventional power supply apparatus is mounted.

It may occur that one inductor can be eliminated, if the inductor 23 used in the stepdown switching power supply circuit 21 is also used for the stepup switching power supply circuit 41 by utilizing the technique enabling to share the same inductor between the stepdown switching power supply circuit and the stepup switching power supply circuit, as disclosed in Japanese Patent Application Laid-open No. 2000-166223. However, it is not practical to apply such a technique to the conventional power supply apparatus as shown in FIG. 8 for the reasons set forth below.

First, when the transistor 43 of the stepup switching power supply circuit 41 is turned on, not only a current flows through the inductor 23 used for both the voltage stepup operation and the voltage stepdown operation, but also a large current flows through the inductor 12 of the filter circuit 11 and the transistor 22 of the stepdown switching power supply circuit 21 by way of the transistor 43 of the stepup switching power supply circuit 41. Accordingly, the power loss of the entire power supply apparatus increases inadmissibly.

Secondary, to use the inductor 23 for both the voltage stepup operation and the voltage stepdown operation, the number of turns thereof has to be increased, and the winding wire thereof has to be thickened. That is because the inductor needs to have a large inductance to provide a large voltage smoothing effect when it is used for the voltage stepdown operation, and needs to have a small internal resistance to provide a high power supply capacity when it is used for the voltage stepup operation.

SUMMARY OF THE INVENTION

The present invention provides a power supply apparatus comprising:

a stepdown switching power supply circuit including a first switching element connected to an internal power supply line of the power supply apparatus at one end thereof, and a smoothing circuit operating to smooth a voltage at the other end of the switching element, the stepdown switching power supply circuit outputting, from the smoothing circuit, a voltage lower than a voltage applied to the internal power supply line by on/off driving the first switching element;

a filter circuit located in the upstream of the stepdown switching power supply circuit, the filter circuit including a first inductor connected in series between the internal power supply line and an external power supply line of the power supply apparatus, the external power supply line being applied with an external voltage of an external voltage source;

a stepup switching power supply circuit including a second inductor connected in series between the internal power supply line and an external power supply line, and a second switching element connected in series between an end of the inductor connected to the internal power supply line and a ground line to which a low-voltage side terminal of the external voltage source is connected, the stepup switching power supply circuit generating, at the one end of the inductor, a voltage higher than the external voltage by on/off driving the second switching element;

wherein one and same inductor is used as the first inductor and the second inductor.

The number of the inductors used in the power supply apparatus of the invention is smaller by one than the conventional power supply apparatus shown in FIG. 8. Accordingly, the electronic control unit in which the power supply apparatus of the invention is mounted can be made compact in size and manufactured at low cost. Although a large current flows through the second inductor by way of the second switching element of the stepup switching power supply circuit when the second switching element is in the on state, it does not occur that a large current flows through the first switching element and the smoothing circuit including an inductor of the stepdown switching power supply circuit by way of the second switching element. That is to say, only the current to be supplied to the power supply objects flows through the first switching element and the inductor of the stepdown switching power supply circuit. Accordingly, since the power loss of the entire power supply apparatus of the present invention does not become large, it is not necessary to use a component having an unnecessary large current capacity for each of the first switching element and the inductor of the stepdown switching power supply circuit. In addition, since it suffices that each of the inductor of the stepup switching power supply circuit and the inductor of the stepdown switching power supply circuit has an inductor characteristic to meet its role (elimination of high frequency component, or generation of flyback voltage), it is possible not to use a large inductor unlike the case in which the technique disclosed in Japanese Patent Application Laid-open No. 2000-166223 (the technique for sharing the same inductor for the voltage stepup operation and the voltage stepdown operation) is applied to the conventional power supply apparatus shown in FIG. 8.

The power supply apparatus of the invention may further comprise a mode switching circuit for switching an operation mode of the power supply apparatus between a stepup mode where the second switching element is kept at an off state, and the first switching element is on/off driven so that a voltage lower than the external voltage is outputted from the stepdown switching power supply circuit, and a stepup mode where the second switching element is on/off driven, and the first switching element is kept at an on state so that a voltage higher than the external voltage is outputted from the stepdown switching power supply circuit.

The mode switching circuit may be configured to switch the operation mode from the stepdown mode to the stepup mode upon detecting that the external voltage falls below a predetermined value, and to switch the operation mode from the stepup mode to the stepdown mode upon detecting that the external voltage exceeds the predetermined value.

The mode switching circuit may be configured to turn off the second switching element in response to a stepup stop signal received from outside of the power supply apparatus.

An output voltage of the stepdown switching power supply circuit may be applied to a plurality of power supply lines connected to a plurality of power supply objects in order that the power supply objects are supplied with electric power on an individual basis. In this case, the mode switching circuit may be configured to cut off one of the power supply lines when the mode switching circuit switches the operation mode to the stepup mode.

The stepdown switching power supply circuit may be provided plurally, and the mode switching circuit may be configured to inhibit one of a plurality of the stepdown switching power supply circuits from outputting a voltage when the mode switching circuit switches the operation mode to the stepup mode.

The first switching element and the second switching element may be on/off driven by one and same control circuit included in the power supply apparatus.

The external voltage source may be a vehicle-use battery, and the power supply apparatus may be configured to output a power supply voltage to be supplied to an electronic control unit mounted in a vehicle.

Other advantages and features of the invention will become apparent from the following description including the drawings and claims.

PREFERRED EMBODIMENTS OF THE INVENTION

First Embodiment

Figure 1:
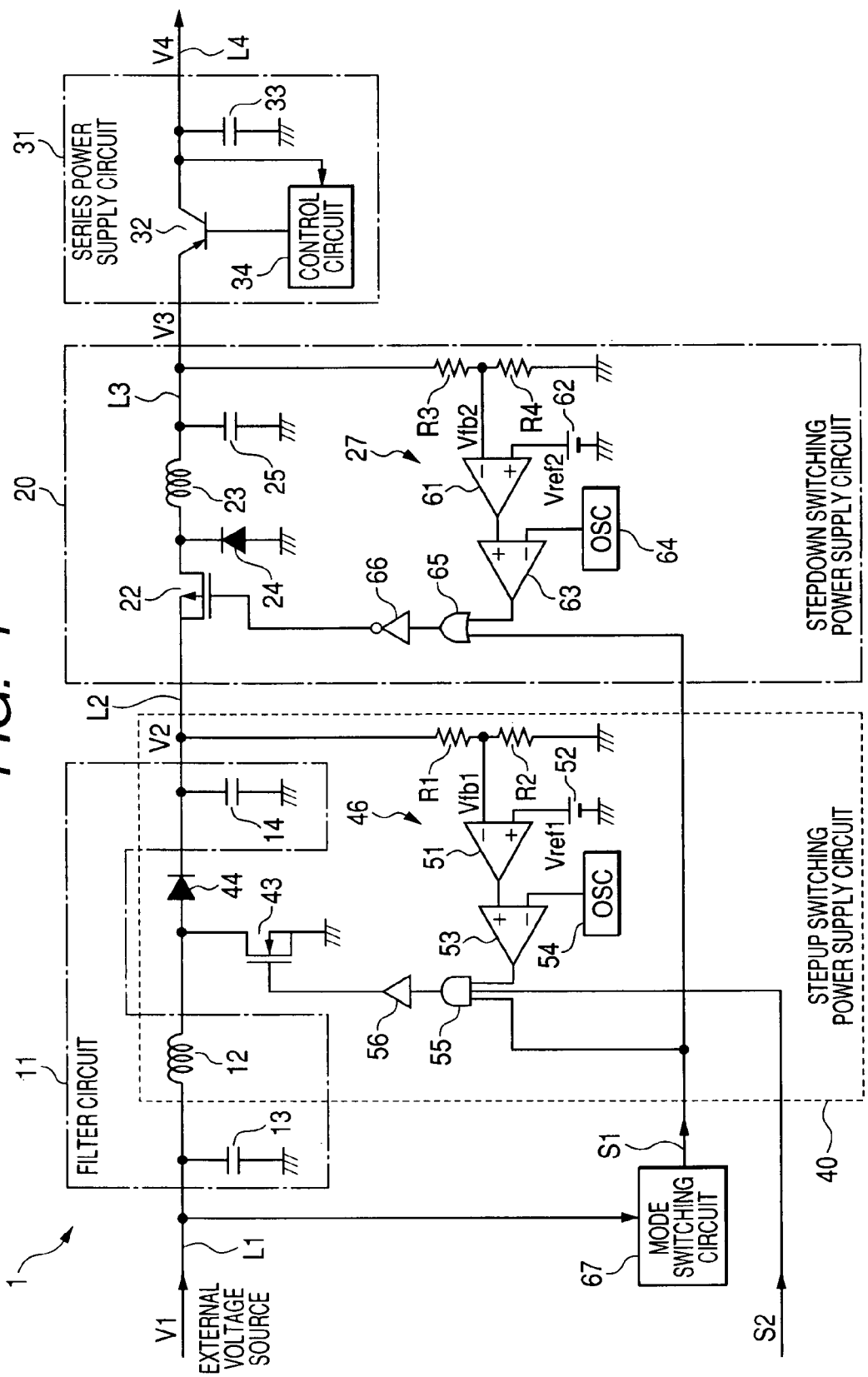
FIG. 1 is a circuit diagram of a power supply apparatus according to a first embodiment of the invention.

FIG. 1 is a circuit diagram of a power supply apparatus 1 according to a first embodiment of the invention. In FIG. 1, the same reference characters as those in FIG. 8 indicate the same or corresponding components.

Figure 8:
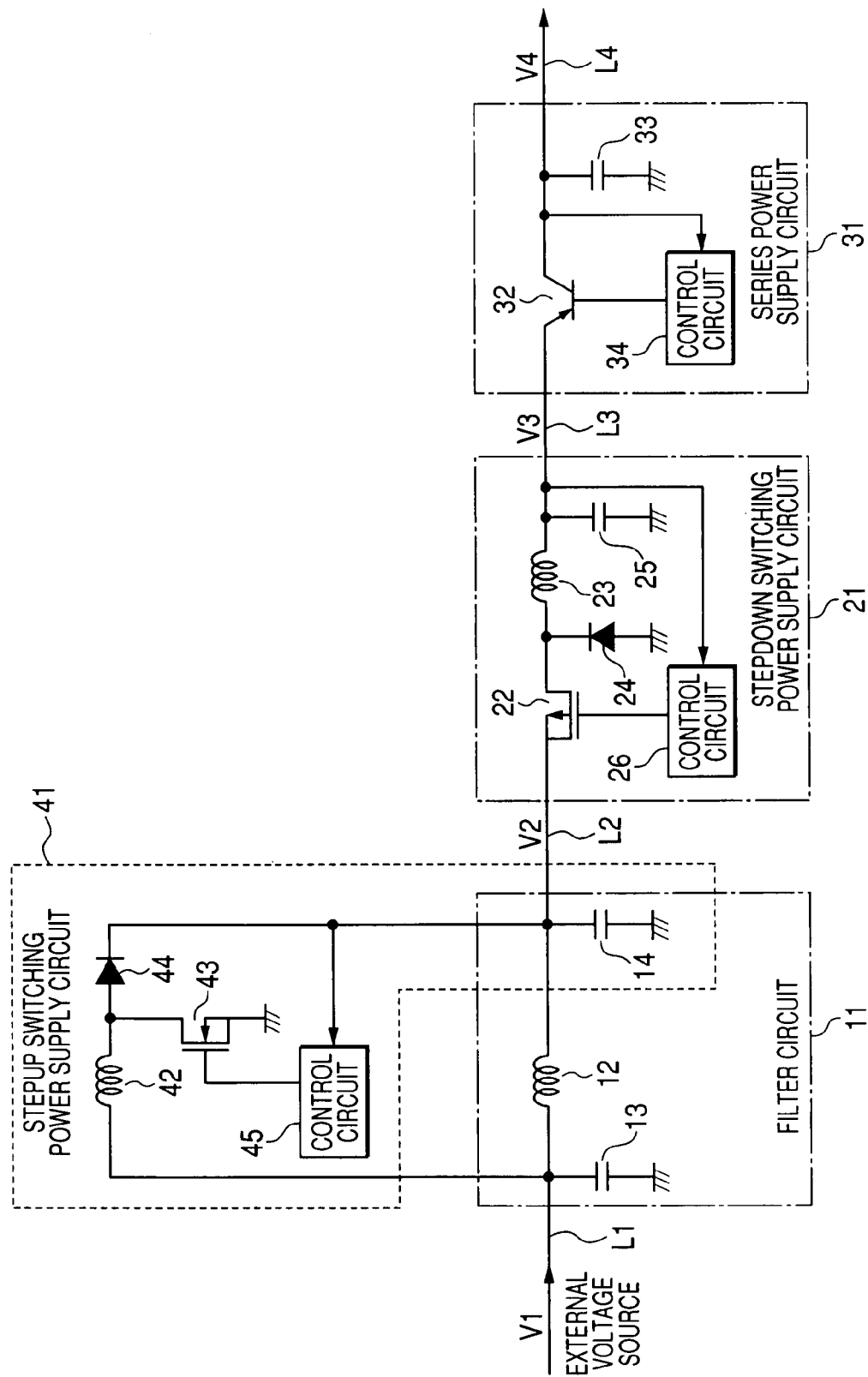
FIG. 8 is a circuit diagram of a conventional power source apparatus.

The structure of the power supply apparatus 1 of the first embodiment shown in FIG. 1 is different from that of the power supply apparatus shown in FIG. 8 in that the stepup switching power supply circuit 41 is replaced by a stepup switching power supply circuit 40, and the stepdown switching power supply circuit 21 is replaced by a stepdown switching power supply circuit 20.

In this embodiment, the inductor 12 of the filter circuit 11 is used also as an inductor of the stepup switching power supply circuit 40. Accordingly, the drain of the transistor 43 operating as a stepup switching element is connected to one end of the inductor 12, which is located on the side opposite to the power supply line L1. And the anode of the diode 44 is connected to the node between the inductor 12 and the transistor 43.

In FIG. 1, the circuit constituted by components indicated by the reference characters R1, R2, and 51 to 56 is a control circuit 46 for on/off controlling the transistor 43, which is equivalent to the control circuit 45 shown in FIG. 8.

In this control circuit 46, resistors R1, R2 are connected in series between the power supply line L2 and the ground line. The voltage of V2 the power supply line L2 (the output voltage of the stepup switching power supply circuit 40) is divided down by these resistors R1, R2.

The divided voltage Vfb1 produced at the node between the resistors R1, R2 is applied as a feedback voltage to the inverting input terminal (negative input terminal) of an error amplifier 51. When the resistance of the resistor R1 is r1, and the resistance of the resistor R2 is r2, the divided voltage Vfb1 is equal to $V2 \times r2/(r1+r2)$. On the other hand, a reference voltage Vref1 generated by a reference voltage source 52 is applied to the non-inverting input terminal (positive input terminal) of the error amplifier 51. The error amplifier 51 amplifies a difference between the reference voltage Vref1 and the divided voltage Vfb1, and outputs it as an error signal.

This error signal is applied to the non-inverting input terminal (positive input terminal) of a comparator 53. On the other hand, a sawtooth wave signal having a constant period, which is generated by an oscillator circuit 54, is applied to the inverting input terminal (negative input terminal) of the comparator 53. The comparator 53 outputs a PWM (Pulse Width Modulation) signal having a duty ratio depending on the voltage value of the error signal outputted from the error amplifier 51. In this embodiment, since the signal outputted from the comparator 53 is active high, the duty ratio of this PWM signal represents a proportion of a high-level time in one period.

The PWM signal outputted from the comparator 53 is inputted to an AND circuit 55. A switching signal S1 generated by a mode switching circuit 67 (to be described later), and an external command signal S2 supplied from the outside of the power supply apparatus are also inputted to the AND circuit 55.

An output signal of the AND circuit 55 is inputted to a drive circuit 56 operating to drive the transistor 43. The drive circuit 56 turns on the transistor 43 when the AND circuit 55 outputs a high-level signal, and turns off the transistor 43 when the AND circuit 55 outputs a low-level signal.

When both the switching signal S1 and the external command signal S2 are at a high level, and accordingly the PWM signal is inputted to the drive circuit 56 from the comparator 53, the control circuit 46 performs duty control on the transistor 43 such that the divided voltage Vfb1 becomes equal to the reference voltage Vref1. As a consequence of this duty control, the transistor 43 is turned on and off, so that the voltage V2 of the power supply line L2 is kept at a target output voltage (7V, in this embodiment, referred to as "stepup target voltage" hereinafter) of the stepup switching power supply circuit 40. On the other hand, when at least one of the switching signal S1 and the external command signal S2 is at a low level, the transistor 43 is kept in the off state irrespective of the voltage V2 of the power supply line L2. It should be noted that when the voltage V1 of an external voltage source applied to the power supply line L1 is higher than the stepup target voltage, the output of the comparator 53 is kept at the low-level (in other words, the duty ratio of the PWM signal is kept at 0), and accordingly the transistor 43 is kept at the off state, even if both the switching signal S1 and the external command signal S2 are at a high level.

Although the structure of a control circuit for controlling the transistor 22 is shown in detail in FIG. 1, the structure of the stepdown switching power supply circuit 20 is basically the same as that of the stepdown switching power supply circuit 21 shown in FIG. 8.

In FIG. 1, the reference numeral 27 denotes this control circuit constituted by components indicated by the reference characters R3, R4, and 61 to 66. This control circuit 27, which is for on/off controlling the transistor 22, is equivalent to the control circuit 26 shown in FIG. 8.

In this control circuit 27, resistors R3, R4 are connected in series between the power supply line L3 and the ground line. The voltage V3 of the power supply line L3 (the output voltage of the stepdown switching power supply circuit 20) is divided down by these resistors R3, R4.

The divided voltage Vfb2 produced at the node between the resistors R3, R4 is applied as a feedback voltage to the inverting input terminal (negative input terminal) of an error amplifier 61. When the resistance of the resistor R3 is r3, and the resistance of the resistor R4 is r4, the divided voltage Vfb2 is equal to V3×r4/(r3+r4). On the other hand, a reference voltage Vref2 generated by a reference voltage source 62 is applied to the non-inverting input terminal (positive input terminal) of the error amplifier 61. The error amplifier 61 amplifies a difference between the reference voltage Vref2 and the divided voltage Vfb2, and outputs it as an error signal.

This error signal is applied to the non-inverting input terminal (positive input terminal) of a comparator 63. On the other hand, a sawtooth wave signal having a constant period, which is generated by an oscillator circuit 64, is applied to the inverting input terminal (negative input terminal) of the comparator 63. The comparator 63 outputs a PWM signal having a duty ratio depending on the voltage value of the error signal outputted from the error amplifier 61. In this embodiment, the signal outputted from the comparator 63 is active high.

The output signal (PWM signal) of the comparator 63 is inputted to an OR circuit 65. The switching signal S1 generated by the mode switching circuit 67 (to be described later) is also inputted to the OR circuit 65. An output signal of the OR circuit 65 is inputted to a drive circuit 66 as a drive signal. The drive circuit 66 turns on the transistor 22 when the output signal of the OR circuit 65 is at the high level, and turns off the transistor 22 when the output signal of the OR circuit 65 is at the low level.

When the switching signal S1 inputted to the OR circuit 65 is at a low level, and accordingly the PWM signal is inputted to the drive circuit 66 from the comparator 63, the control circuit 27 performs duty control on the transistor 22 such that the divided voltage Vfb2 becomes equal to the reference voltage Vref2. As a consequence of this duty control, the transistor 22 is turned on and off, so that the voltage V3 of the power supply line L3 is kept at a target output voltage (6V, in this embodiment, referred to as "stepdown target voltage" hereinafter) of the stepdown switching power supply circuit 20. On the other hand, when the switching signal S1 inputted to the OR circuit 65 is at a high level, the transistor 22 is kept at the on state irrespective of the voltage V3 of the power supply line L3.

The oscillator circuits 54, 64 of the control circuits 27, 46 may be so configured as to generate a triangular wave signal instead of the sawtooth wave signal. As explained above, the power supply apparatus 1 of this embodiment is provided with the mode switching circuit 67.

Figure 2:
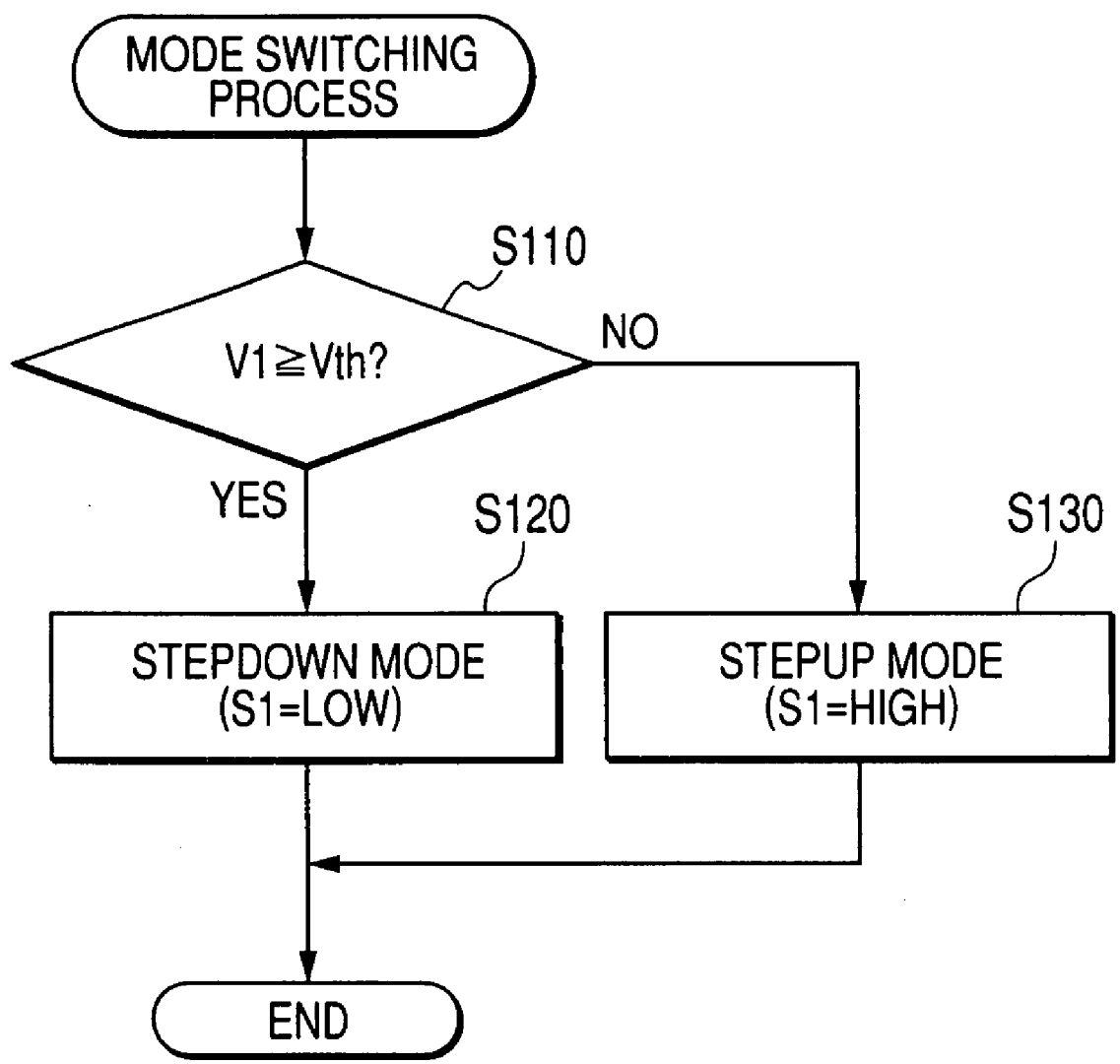
FIG. 2 is a flowchart showing a mode switching process performed by a mode switching circuit included in the power supply apparatus shown in FIG. 1.

This mode switching circuit 67 includes a comparator (not shown) performing a value comparison between the voltage V1 of the power supply line L1 and a predetermined threshold voltage Vth (8V in this embodiment). The mode switching circuit 67 performs a mode switching process shown in the flowchart of FIG. 2.

The mode switching process begins by judging whether or not the voltage V1 of the power supply line L1 is equal to or higher than the threshold voltage Vth at step S110 by use of the comparator. If it is determined that the voltage V1 of the power supply line L1 is equal to or higher than the threshold voltage Vth (YES at step S110), the switching signal S1 supplied to the AND circuit 55 and the OR circuit 65 is set at a low level at step S120. On the other hand, if it is determined that the voltage V1 of the power supply line L1 is not equal to or higher than the threshold voltage Vth (NO at step S110), the switching signal S1 is set at a high level at step S130, in order to step up the voltage V1.

Figure 3A:
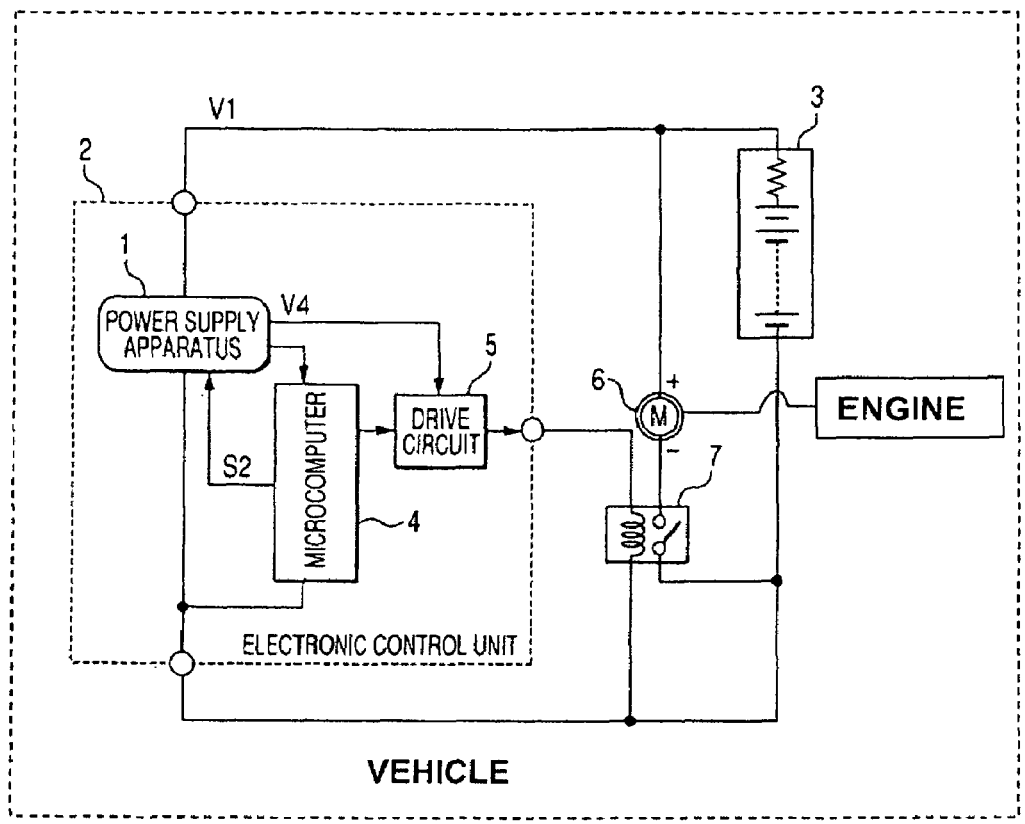
FIG. 3A is a diagram showing a structure of a vehicle-use electronic control unit in which the power supply apparatus shown in FIG. 1 is mounted.

As shown in FIG. 3A, the power supply apparatus 1 of this embodiment is mounted in a vehicle-use electronic control unit 2. Accordingly, a voltage at a positive terminal (battery voltage) of a vehicle battery 3 as the external power source is applied to the power supply line L1, so that the power supply apparatus 1 can generate a constant voltage (power supply voltage) V4 (5V in this embodiment) from this battery voltage, and supply it to power supply objects including a microcomputer 4 included in the electronic control unit 2, and peripheral circuits of the microcomputer 4 such as a drive circuit 5 operating to drive an actuator in accordance with a control signal sent from the microcomputer 4.

The electronic control unit 2 controls at least a starter motor 6 for starting a vehicle engine.

Figure 3B:
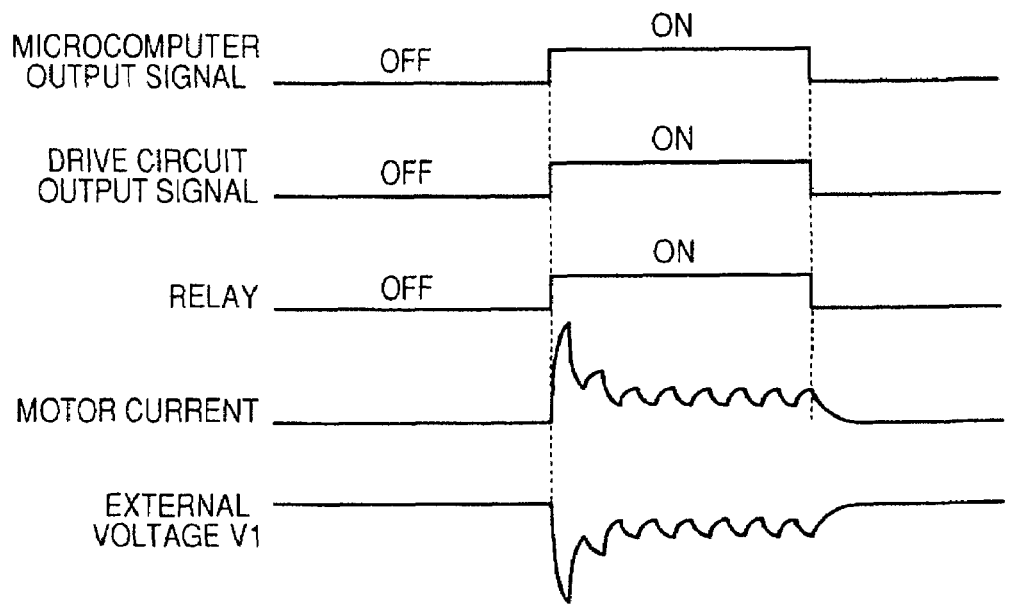
FIG. 3B is a time chart of various signals in the vehicle-use electronic control unit shown in FIG. 3A.

More specifically, as shown in FIG. 3B, the microcomputer 4 sends the control signal to the drive circuit 5 upon detecting that a starter switch (not shown) is turned on. As a consequence, the drive circuit 5 turns on a starter relay 7. This causes a motor current to flow from the battery 3 to the starter motor 6 to thereby start the starter motor 6 to rotate. The rotation of the starter motor 6 causes the engine to be cranked. At a moment when the starter motor 6 starts to rotate, a large current (an inrush current) flows through the starter motor 6. Accordingly, the battery voltage V1 instantly drops at this moment as shown in FIG. 3B.

As shown in FIG. 3A, in this embodiment, the external command signal S2 is outputted from the microcomputer 4 to the power supply apparatus 1. The microcomputer 4 sets the external command signal S2 at a high level to allow the transistor 43 of the stepup-switching power supply circuit 40 to be turned on, when the microcomputer 4 is supplied with the power supply voltage V4 from the power supply apparatus 1, and starts to operate.

Figure 4:
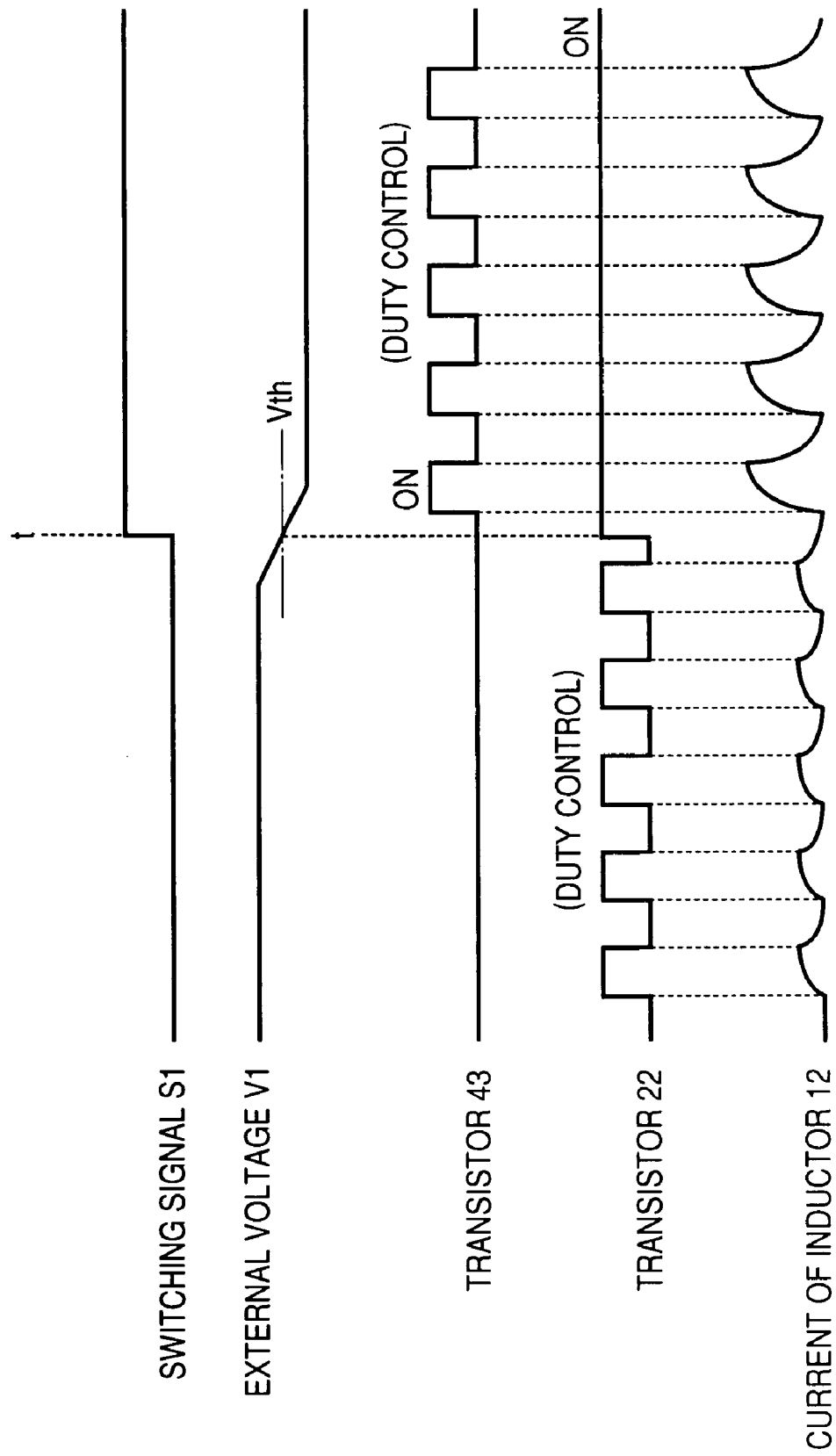
FIG. 4 is a time chart of various signals in the power supply apparatus shown in FIG. 1.

Next, the operation of the power supply apparatus 1 is explained with reference to a time chart of FIG. 4. As shown in FIG. 4, in the normal state where the battery voltage V1 is higher than the threshold voltage Vth (before time t in FIG. 4), the switching signal S1 outputted from the mode switching circuit 67 is at a low level (step S120), so that the transistor 43 of the stepup switching power supply circuit 40 is kept at the off state. As a consequence, the battery voltage V1 is supplied to the stepdown switching power supply circuit 20 through the filter circuit 11 and the diode 44 as it is without being stepped up. In this state, the transistor 22 is on/off controlled by the control circuit 27 such that the voltage V3 of the power supply line L3 is kept at the stepdown target voltage (=6V).

To sum up, when the battery voltage V1 is higher than the threshold voltage Vth, the power supply apparatus 1 operates in a stepdown mode where only the voltage stepdown operation is performed to step down the battery voltage V1 to the voltage V3 equal to the stepdown target voltage of 6V by use of the stepdown switching power supply circuit 20. This voltage V3 is further stepped down to the voltage V4 of 5V by the series power supply circuit 31, and supplied to the power supply objects including the microcomputer 4 and the drive circuit 5.

In this stepdown mode, the inductor 12 serves as a high-frequency component eliminating inductor of the filter circuit 11 in order to prevent the switching noise caused by the voltage stepdown operation of the stepdown switching power supply circuit 20 from being emitted to the outside of the electronic control unit 20.

On the other hand, when the battery voltage V1 falls below the threshold voltage Vth (after time t in FIG. 4), the switching signal S1 outputted from the mode switching circuit 67 is changed to a high level (step S130), so that the transistor 43 of the stepdown switching power supply circuit 20 is kept at the on state. In this state, the power supply line L2 and the power supply line L3 are connected to each other through the transistor 22 and the inductor 23 of the stepdown switching power supply circuit 20.

Accordingly, since the external command signal S2 outputted from the microcomputer 4 is at a high level at this time, the transistor 43 of the stepup switching power supply circuit 40 is allowed to turn on depending on the PWM signal outputted from the comparator 53 when the switching signal S1 becomes high level. In this state, the transistor 43 is on/off controlled by the control circuit 46 such that the voltage V2 of the power supply line L2 is kept at the stepup target voltage (=7V). This voltage V2 of the power supply line L2 is supplied to the series power supply circuit 31 through the stepdown switching power supply circuit 20 without undergoing substantial change.

In summary, when the battery voltage V1 falls below the threshold voltage Vth, the power supply apparatus 1 starts to operate in a stepup mode where only the voltage stepup operation is performed to keep the voltage V2 of the power supply line L2 above or in the vicinity of the stepup target voltage by use of the stepdown switching power supply circuit 40. In this stepup mode, the voltage V2 is reduced to the power supply voltage V4 by the series power supply circuit 31, and supplied to the power supply objects including the microcomputer 4.

Accordingly, even when the battery voltage V1 falls below 5V, it is possible to supply the power supply voltage V4 of 5V to the power supply objects to enable the electronic control unit 2 to continue its operation.

In this stepup mode, the inductor 12 serves as a voltage stepping up inductor operating to accumulate therein energy for a period during which the transistor 43 is in the on state, and discharges the accumulated energy when the transistor 43 is turned off.

In the power supply apparatus 1 having the above described structure, the inductor 12 of the filter circuit 11 serves also as an inductor of the stepup switching power supply circuit 40.

Since the number of the inductors used in the power supply apparatus 1 is smaller by one than the conventional power supply apparatus shown in FIG. 8, the electronic control unit 2 in which this power supply apparatus 1 is mounted can be made compact in size and manufactured at low cost.

Although a large current flows through the inductor 12 by way of the transistor 43 of the stepup switching power supply circuit 40 when the transistor 43 is in the on state, it does not occur that a large current flows through the transistor 22 and the inductor 23 of the stepdown switching power supply circuit 20 by way of the transistor 43. That is to say, only the current to be supplied to the power supply objects flows through the transistor 22 and the inductor 23 of the stepdown switching power supply circuit 20. Accordingly, since the power loss of the entire power supply apparatus 1 does not become large, it is not necessary to use a component having an unnecessary large current capacity for each of the transistor 22 and the inductor 23 of the stepdown switching power supply circuit 20.

In addition, since it suffices that each of the inductor 12 of the stepup switching power supply circuit 40 and the inductor 23 of the stepdown switching power supply circuit 20 has an inductor characteristic to meet its role (elimination of high frequency component, or generation of flyback voltage), it is possible not to use a large inductor unlike the case in which the technique disclosed in Japanese Patent Application Laid-open No. 2000-166223 (the technique for sharing the same inductor for the voltage stepup operation and the voltage stepdown operation) is applied to the power supply apparatus shown in FIG. 8.

Furthermore, the switching power loss of the power supply apparatus 1 of this embodiment is small, because it is configured to operate in one of the stepdown mode and the stepup mode, and accordingly it does not occur that both the transistor 22 and the transistor 43 are on/off controlled at the same time.

Besides in the power supply apparatus 1 of this embodiment, when the external command signal S2 outputted from the microcomputer 4 becomes low level, the transistor 43 is inhibited from being turned on. Accordingly, in a case where the power supply apparatus 1 is operating in the stepup mode as a result of the battery voltage V1 falling below the threshold voltage Vth, it is possible to intentionally stop the voltage regulating operation of the power supply apparatus 1 by setting the external command signal S2 at a low level. Accordingly, if the microcomputer 4 is configured to send the external command signal S2 set at a low level to the power supply apparatus 1 after carrying out a specific process, it becomes possible to intentionally let a system constituted by the microcomputer 4 down after the microcomputer 4 carries out this specific process when the battery voltage V1 is below a minimum voltage required for the microcomputer 4 to operate.

Although the power supply apparatus 1 of this embodiment is configured to switch its operation mode between the stepup mode and the stepdown mode by use of the mode switching circuit 67 included therein, this switching may be performed in accordance with a signal sent from outside the power supply apparatus 1. That is, the switching signal S1 may be supplied from an external circuit, for example, from the microcomputer 4. This configuration makes it possible to arbitrarily switch the operation mode of the power supply apparatus 1.

Second Embodiment

Figure 5:
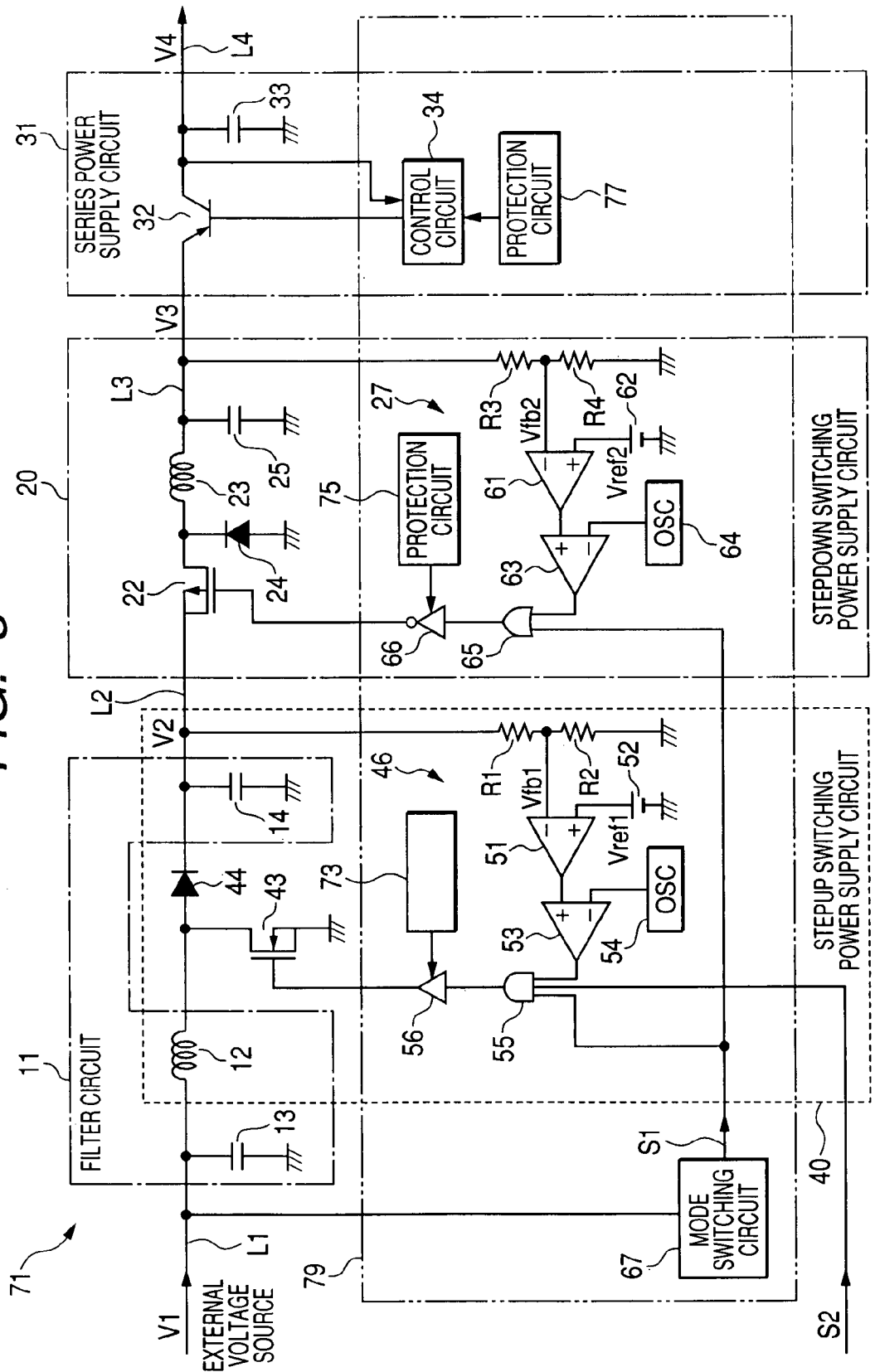
FIG. 5 is a circuit diagram of a power supply apparatus according to a second embodiment of the invention.

FIG. 5 is a circuit diagram of a power supply apparatus 71 according to a second embodiment of the invention. In FIG. 5, the same reference characters as those in FIG. 1 indicate the same or corresponding components.

As seen from FIG. 5, the second embodiment differs from the first embodiment in the following points (1) to (5).
(1) The stepup-switching power supply circuit 40 is provided with a protection circuit 73 configured to cause the drive circuit 56 of the control circuit 46 to forcibly turn off the transistor 43 upon detecting overcurrent or overheating of the transistor 43.
(2) The stepup-switching power supply circuit 20 is provided with a protection circuit 75 configured to cause the drive circuit 66 of the control circuit 27 to forcibly turn off the transistor 22 on detecting overcurrent or overheating of the transistor.
(3) The series power supply circuit 31 is provided with a protection circuit 77 configured to cause the control circuit 34 to forcibly turn off the transistor 32 upon detecting overcurrent or overheating of the transistor 32.
(4) The control circuit 46 and the protection circuit 73 of the stepup-switching power supply circuit 40, the control circuit 27 and the protection circuit 75 of the stepdown-switching power supply circuit 20, the control circuit 34 and the protection circuit 77 of the series power supply circuit 31, and the mode switching circuit 67 are formed in the same IC 79.

In a case where the protection circuit 73 is intended to detect overcurrent of the transistor 43, it may be so configured as to determine occurrence of overcurrent when a voltage across a current detecting resistor (not shown) connected in series to the transistor 43 exceeds a predetermined value. In a case where the protection circuit 73 is intended to detect overheating of the transistor 43, it may be so configured as to determine occurrence of overheating when a forward voltage drop of a diode disposed in the vicinity of the transistor 43 becomes smaller than a predetermined value. In this case, the transistor 43 to be protected, and the diode for detecting overheating of the transistor 43 may be formed in the IC 79. The above description concerning the detection of overcurrent or overheating can be applied also to the protection circuits 75, 77.

The power supply apparatus 71 of the second embodiment can be made further compact in size and manufactured at further low cost because of the adoption of the IC 79. In addition, the power supply apparatus 71 can have high reliability because of the provision of the protection circuits 73, 75, 77. It should be noted that the protection circuits 73, 75, 77 can be also provided in the first embodiment as can the embodiments described below.

Third Embodiment

Figure 6:
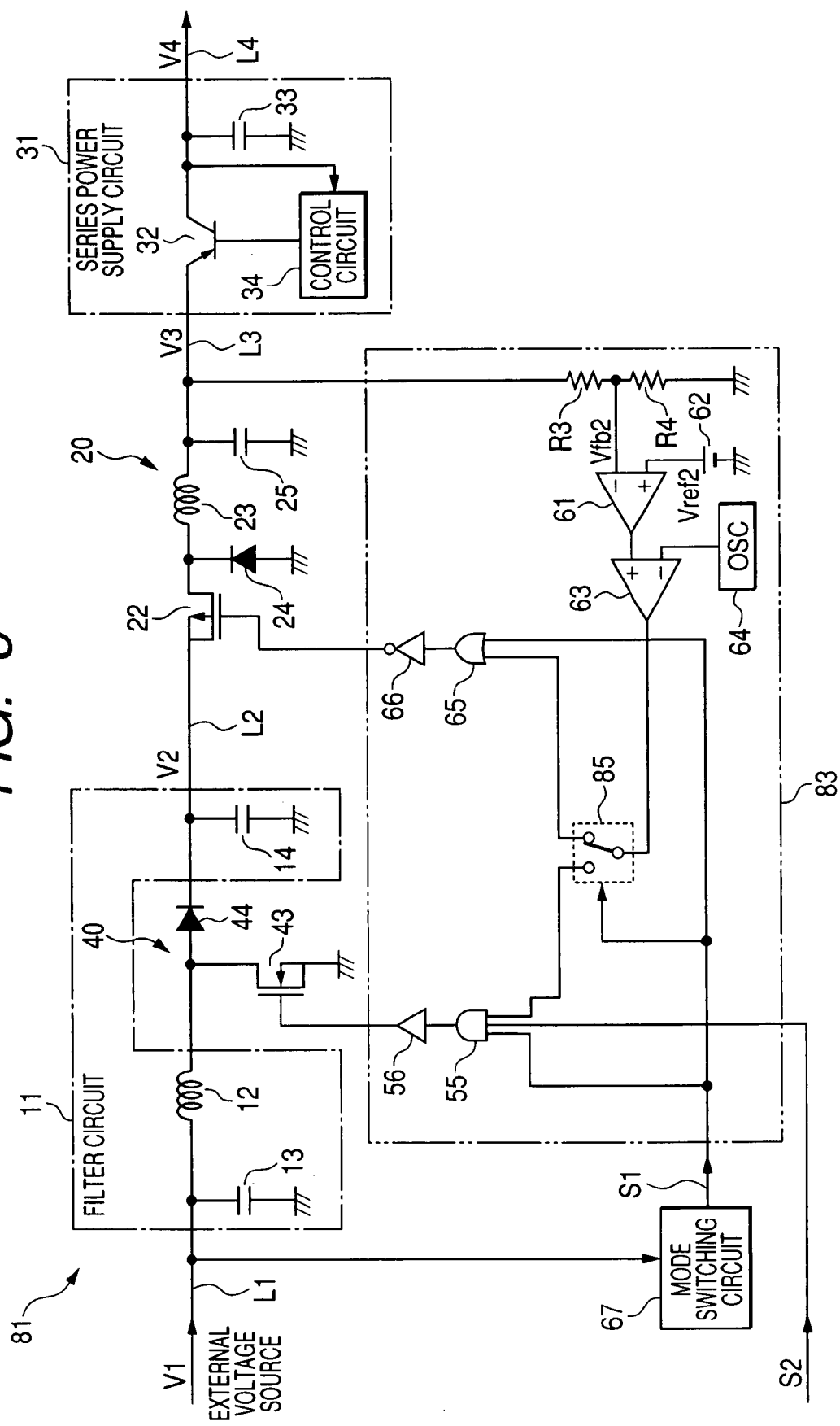
FIG. 6 is a circuit diagram of a power supply apparatus according to a third embodiment of the invention.

FIG. 6 is a circuit diagram of a power supply apparatus 81 according to a third embodiment of the invention. In FIG. 6, the same reference characters as those in FIG. 1 indicate the same or corresponding components.

As seen from FIG. 6, the third embodiment differs from the first embodiment in that the control circuit for on/off controlling the transistor 22 of the stepdown-switching power supply circuit 20, and the control circuit for on/off controlling the transistor 43 of the stepup-switching power supply circuit 40 are combined into the same control circuit 83.

The control circuit 8 includes a PWM signal generating circuit including the resistors R3, R4, error amplifier 61, reference voltage source 62, comparator 63, and oscillator circuit 64. This PWM signal generating circuit, which is similar in structure to the control circuit 27 of the first embodiment, generates the PWM signal used to duty-controls the transistors 22, 43. In this embodiment, the resistors R1, R2, error amplifier 51, reference voltage source 52, comparator 53, and oscillator circuit 54 have been eliminated.

The control circuit 83 further includes a signal switching circuit 85, OR circuit 65, drive circuit 66, AND circuit 55, and drive circuit 56. The output signal (PWM signal) of the comparator 63 is inputted to one of the OR circuit 65 and the AND circuit 55, which the signal switching circuit 85 selects in accordance with the switching signal S1 outputted from the mode switching circuit 67. More specifically, the signal switching circuit 85 transmits the output signal of the comparator 63 to the OR circuit 65 when the switching signal S1 is at a low level, and to the AND circuit 55 when the switching signal S1 is at a high level.

Accordingly, when the switching signal S1 is at a low level, this embodiment operates exactly in the same way as the power supply apparatus 1 of the first embodiment. On the other hand, when the switching signal S1 is at a high level, since the PWM signal outputted from the comparator 63 is inputted to the drive circuit 56 of the transistor 43, the transistor 43 is on/off controlled such that the voltage V3 of the power supply line L3 is kept at the target voltage in the stepdown mode (=6V). However, this embodiment is not different from the first embodiment in that the voltage V1 is stepped up by the stepup switching power supply circuit 40 and inputted to the series power supply circuit 31.

The power supply apparatus 81 of the third embodiment can be made further compact in size and can be manufactured at a further reduced cost, because the control circuit for on/off controlling of the transistor 22 of the stepdown-switching power supply circuit 20, and the control circuit for on/off controlling of the transistor 43 of the stepup-switching power supply circuit 40 are combined into the same control circuit 83. The control circuit 83 may be formed in an IC, or the control circuit 83 and the mode switching circuit 67 may be formed in an IC.

Fourth Embodiment

Figure 7:
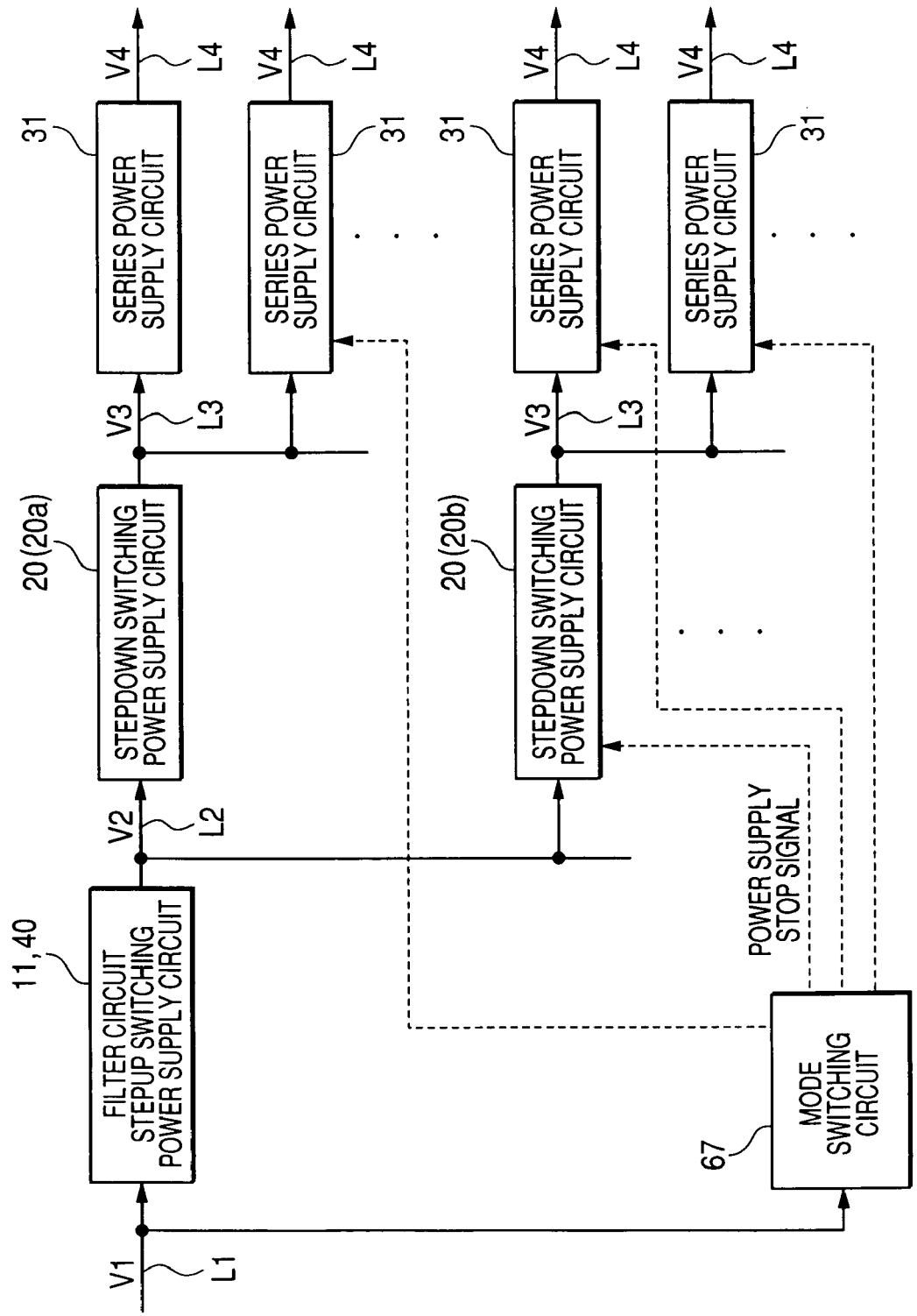
FIG. 7 is a diagram explaining a structure of a power supply apparatus according to a fourth embodiment of the invention.

FIG. 7 is a diagram for explaining a structure of a power supply apparatus according to a fourth embodiment of the invention. As shown in this figure, the power supply apparatus of the fourth embodiment is different from the first to third embodiments in that the stepdown switching power supply circuit 20 is provided plurality in the downstream of the stepup switching power supply circuit 40. That is, in this embodiment, a plurality of the stepdown switching power supply circuits 20 are connected to the power supply line L2 in parallel.

In addition, the series power supply circuit 30 is also provided plurally in the down stream of each of the plurality of the stepdown switching power supply circuits 20. This fourth embodiment in which the stepdown switching power supply circuit 20, series power supply circuit 31, and the power supply L4 are respectively provided plurally makes it possible to serve a plurality of the power supply objects on an individual basis.

In this embodiment, the mode switching circuit 67 performs at least one of operation (A) and operation (B) described below.

(A) The mode switching circuit 67 sends a power supply stop signal to one of the series power supply circuits 31 in order to forcibly turn off the transistor 32 of this one of the series power supply circuits 31 when the mode switching circuit 67 sets the switching signal S1 at a high level, so that the power supply apparatus operates in the stepup mode. As a consequence, the power supply line L3 and the power supply line L4 respectively connected to the input side and the output side of the series power supply circuit 31 that has received the power supply stop signal are isolated from each other, to inhibit power supply to a power supply object connected to this isolated power supply line L4.

(B) The mode switching circuit 67 sends a power supply stop signal to one of the stepdown switching power supply circuits 20 in order to forcibly turn off the transistor 22 of this one of the stepdown switching power supply circuits 20 when the mode switching circuit 67 sets the switching signal S1 at a high level, so that the power supply apparatus operates in the stepup mode. As a consequence, the stepdown switching power supply circuit 20 that has received the power supply stop signal stops outputting the voltage V3, to inhibit power supply to a power supply object associated with this stepdown switching power supply circuit 20.

As understood from the above explanation, the power supply apparatus of the fourth embodiment is configured to reduce the number of the power supply objects actually supplied with electric power to reduce the consumption current when the power supply apparatus starts to operate in the stepup mode due to drop of the voltage V1 of the external voltage source, because of the reason that the power supply capacity of the power supply apparatus is smaller when it operates in the stepup mode than when it operates in the stepdown mode (normal mode). The fourth embodiment makes it possible for important power supply objects to be supplied with electric power without fail when the power supply apparatus starts to operate in the stepup mode as explained below by an example.

Here, it is assumed that the series power supply circuit 31 connected to the stepdown switching power supply circuit indicated by the reference character 20a in FIG. 7 generates the power supply voltage V4 to be supplied to a main microcomputer performing important processes and peripheral circuits of the main microcomputer, and the series power supply circuit 31 connected to the stepdown switching power supply circuit indicated by the reference character 20b in FIG. 7 generates the power supply voltage V4 to be supplied to a sub-microcomputer performing not important processes and peripheral circuits of the sub-microcomputer. In this assumption, if the power supply apparatus is configured such that the mode switching circuit 67 outputs the power supply stop signal to the stepdown switching power supply circuit 20b or the series power supply circuit 31 connected to this stepdown switching power supply circuit 20b when the power supply apparatus starts to operate in the stepup mode, it is possible for a control system constituted by the main microcomputer to continue to operate normally when the power supply apparatus starts to operate in the stepup mode.

It should be noted that the power supply apparatus of this embodiment is not necessarily configured to forcibly turn off the transistor 22 of the stepdown switching power supply circuit 20 or the transistor 32 of the series power supply circuit 31 by use of the power supply stop signal. For example, the power supply apparatus of this embodiment may be so configured that a specific one of the power supply lines L2 and a specific one of the power supply lines L3 is isolated from each other by an appropriate switching element.

Although the fourth embodiment has been described to include a plurality of the stepdown switching power supply circuits 20, the fourth embodiment may have only one stepdown switching power supply circuit 20 to which a plurality of the series power supply circuit 31 are connected.

It is a matter of course that various modifications can be made to the above described embodiments.

For example, the diode 24 of the stepdown switching power supply circuit 20 and the diode 44 of the stepup switching power supply circuit 40 may be replaced by a transistor (switching element), respectively. In this case, the transistor used as an alternative to the diode 24 is on/off controlled in an opposite way with respect to the transistor 22, and the transistor used as an alternative to the diode 44 is on/off controlled in an opposite way with respect to the transistor 43.

The voltage V3 outputted from the stepdown switching power supply circuit 20 may be directly supplied to the power supply objects including the microcomputer to eliminate the series power supply circuit 31.

It should be noted that the power supply apparatus of the present invention is not limited to use for a vehicle-mounted electronic control unit. For example, the present invention can be applied to mobile devices and cellular phones.

The above explained preferred embodiments are exemplary of the invention of the present application which is described solely by the claims appended below. It should be understood that modifications of the preferred embodiments may be made as would occur to one of skill in the art.

What is claimed is:

1. A power supply apparatus comprising:
a stepdown switching power supply circuit including a first switching element connected to an internal power supply line of said power supply apparatus at one end thereof, and a smoothing circuit operating to smooth a voltage at the other end of said switching element, said stepdown switching power supply circuit outputting, from said smoothing circuit, a voltage lower than a voltage applied to said internal power supply line by on/off driving said first switching element;

a filter circuit located in the upstream of said stepdown switching power supply circuit, said filter circuit including an inductor connected in series between said internal power supply line and an external power supply line of said power supply apparatus, said external power supply line being applied with an external voltage of an external voltage source;

a stepup switching power supply circuit including the inductor connected in series between said internal power supply line and an external power supply line, and a second switching element connected in series between an end of said inductor connected to said internal power supply line and a ground line to which a low-voltage side terminal of said external voltage source is connected, said stepup switching power supply circuit generating, at said one end of said inductor, a voltage higher than said external voltage by on/off driving said second switching element; and a mode switching circuit for switching an operation mode of said power supply apparatus between a stepdown mode where said second switching element is kept at an off state, and said first switching element is on/off driven so that a voltage lower than said external voltage is outputted from said stepdown switching power supply circuit, and a stepup mode where said second switching element is on/off driven, and said first switching element is kept at an on state so that a voltage higher than said external voltage is outputted from said stepdown switching power supply circuit, and wherein said mode switching circuit is configured to switch said operation mode from said stepdown mode to said stepup mode upon detecting that said external voltage falls below a predetermined value, and to switch said operation mode from said stepup mode to said stepdown mode upon detecting that said external voltage exceeds said predetermined value.

2. The power supply apparatus according to claim 1, wherein said mode switching circuit is configured to turn off said second switching element in response to a stepup stop signal received from outside of said power supply apparatus.

3. The power supply apparatus according to claim 1, wherein an output voltage of said stepdown switching power supply circuit is applied to a plurality of power supply lines connected to a plurality of power supply objects in order that said power supply objects are supplied with electric power on an individual basis, and said mode switching circuit is configured to cut off one of said power supply lines when said mode switching circuit switches said operation mode to said stepup mode.

4. The power supply apparatus according to claim 1, wherein said stepdown switching power supply circuit is provided plurally, and said mode switching circuit is configured to inhibit one of a plurality of said stepdown switching power supply circuits from outputting a voltage when said mode switching circuit switches said operation mode to said stepup mode.

5. The power supply apparatus according to claim 2, wherein said stepdown switching power supply circuit is provided plurally, and said mode switching circuit is configured to inhibit one of a plurality of said stepdown switching power supply circuits from outputting a voltage when said mode switching circuit switches said operation mode to said stepup mode.

6. The power supply apparatus according to claim 3, wherein said stepdown switching power supply circuit is provided plurally, and said mode switching circuit is configured to inhibit one of a plurality of said stepdown switching power supply circuits from outputting a voltage when said mode switching circuit switches said operation mode to said stepup mode.

7. The power supply apparatus according to claim 1, wherein said first switching element and said second switching element are on/off driven by one and same control circuit included in said power supply apparatus.

8. The power supply apparatus according to claim 1, wherein said external voltage source is a vehicle-use battery, and said power supply apparatus is configured to output a power supply voltage to be supplied to an electronic control unit mounted in a vehicle.

9. The power supply apparatus according to claim 8, wherein said electronic control unit is for controlling a starter motor for starting an engine of said vehicle.

* * * * *